June 21, 1932.    G. C. BURD    1,864,338
PROCESS OF TREATING WIRE ROPE
Filed July 9, 1926
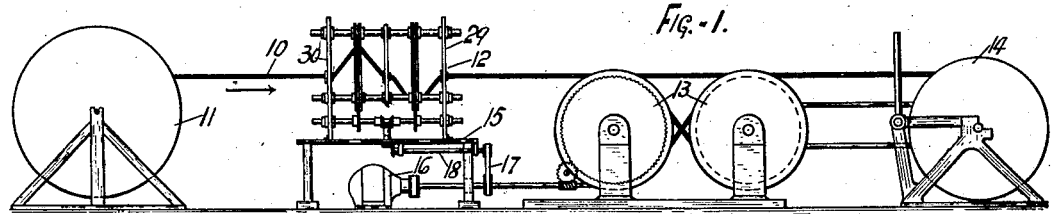
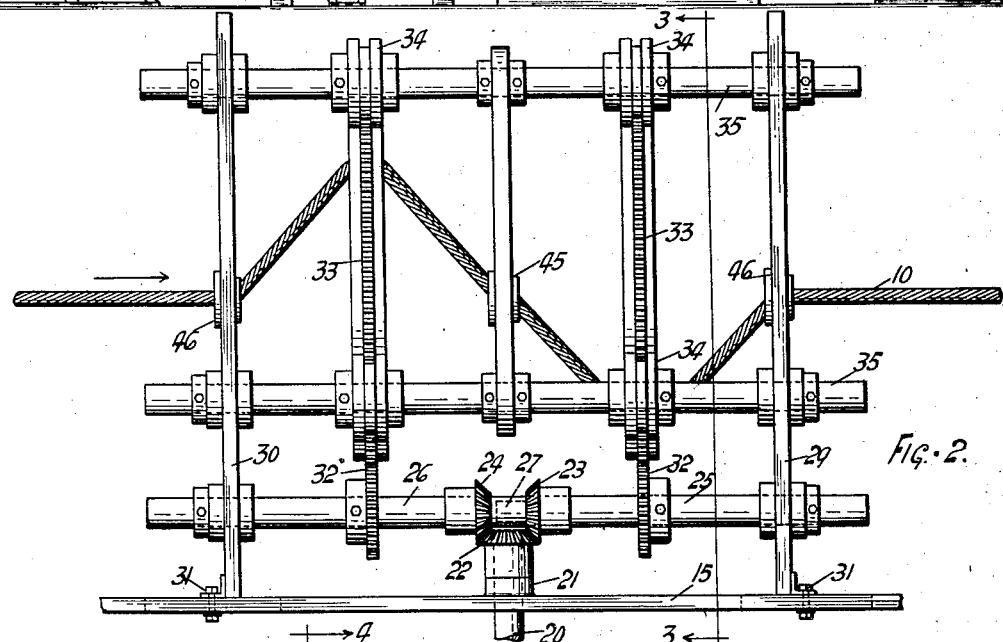
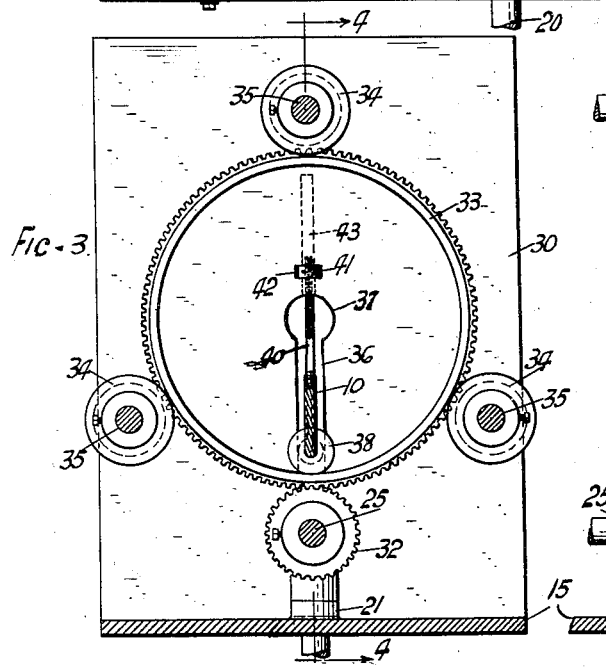
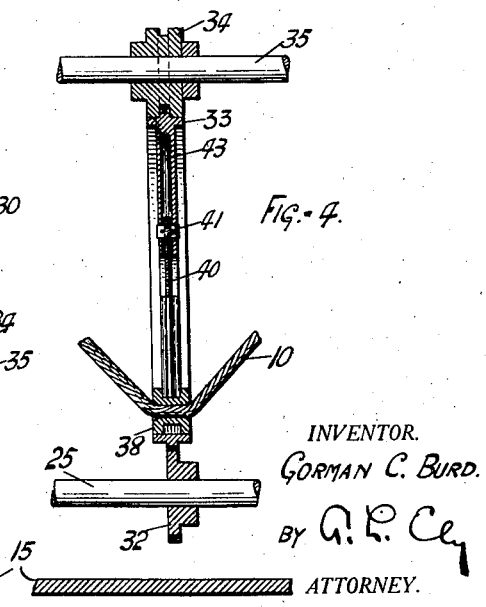
INVENTOR.
GORMAN C. BURD.
BY G. P. Cly
ATTORNEY.

Patented June 21, 1932

1,864,338

UNITED STATES PATENT OFFICE

GORMAN C. BURD, OF AKRON, OHIO, ASSIGNOR TO AMERICAN CABLE COMPANY, INC., A CORPORATION OF DELAWARE

PROCESS OF TREATING WIRE ROPE

Application filed July 9, 1926. Serial No. 121,397.

This invention relates to a process for treating wire rope to obtain certain advantageous results and benefits as will be fully set forth herein.

In the manufacture of wire rope by the usual or ordinary processes, a very considerable strain or torsion is placed upon the wire strands, which strains and stresses are indicated when a wire rope of the ordinary manufacture is cut, the strands flying apart or unraveling instantly. The object of the present invention is to treat the wire rope made by the usual processes so as to remove the strains and stresses with beneficial results noted herein, particularly with the elimination of the tendency to fly apart when the rope is cut.

A rope processed in the manner described has a longer life than ropes made by former methods without the treatment described. The process resists kinking of the rope and eliminates the need for seizing or binding the rope near the point of severance to prevent separation of the components. Not only do the strands show no tendency for the rope to unravel, but the individual components of the strands resist unraveling as well. The rope as treated is easy to handle, easy to splice, and easy to socket.

Other advantages and benefits will be gained and the rope will be improved in other ways, as will be understood by those skilled in this art. It is obvious that, having explained the principles of the invention, other and modified forms thereof may suggest themselves to those skilled in this art, and it is not the intention to limit the invention to the specific process shown and described as changes and modifications in the apparatus and method may be made within the scope of the present invention.

In the drawing is shown one form of apparatus of the invention for carrying out the process described herein, in which Figure 1 is an assembly view showing the several apparatus of a complete rope treating unit;

Figure 2 is an enlarged view of the treating unit;

Figure 3 is a section on the line 3—3 of Figure 2; and

Figure 4 is a section on the line 4—4 of Figure 3.

Wire rope which is manufactured by the ordinary processes known in the art for many years is indicated at 10, being received upon reels, one of which is indicated at 11. From the reel, the wire rope passes to and through a treating unit, indicated in general at 12, thence to the usual pulling drums 13 and to a wind-up reel 14, which are of the usual form known in this art and need not further be described except to state that the wire rope is drawn through the apparatus at the desired speed and with the desired tension.

The special treating apparatus 12, which is shown in detail in Figures 2, 3 and 4, comprises a stand or table 15. A motor 16, which drives the wind-up mechanism, also drives the apparatus 12 through a belt 17 and cross shaft 18, the latter being connected to a vertical shaft 20 seated in a bearing 21 on the table 15. The upper end of shaft 20 carries a bevel gear 22 which meshes with right- and left-hand bevel gears 23 and 24, which are carried upon shafts 25 and 26, respectively. The inner ends of the shafts are telescoped as shown at 27 and their outer ends are supported in vertical plates 29 and 30 which are adjustable transversely of the table by means of slots and bolts 31.

The shafts 25 and 26, which are thus driven in opposite directions, carry drive pinions 32 which are adjustably mounted on the shafts, and each of these pinions meshes with a larger geared disk 33, which is supported upon and guided by flanged rollers 34 adjustably mounted upon horizontal shafts 35 placed at suitable intervals about the gear.

The body of each gear 33 is provided with a radial slot 36 having an enlargement 37 at the center of the gear so that a guide in the form of a flanged spool or bushing 38 may be received therein, the center of the spool being apertured for the passage of the rope 10. The spool is adjustably held at a predetermined distance from the center of the gear by a screw 40, the outer end of which bears against the spool and the inner end being received in a nut 41 set in a recess 42 in the gear, the body of the gear being recessed at 43 for the admission of the screw.

It will be noted that the spool is set at some distance from the center of the gear, being maintained at that point by the tension upon the rope. It will also be observed that the spools in the two gears are arranged at diametrically opposed positions, and that at the center of the unit 12 is arranged a fixed guide 45, and in the end plates 29 and 30 are located two fixed guides 46 all in alinement, so that the rope in passing through the fixed guides 45 and 46 and the spools 38 is given two oppositely turned bends. The depth of the bends and the sharpness thereof is determined by the adjustments of the several parts, being intended to give varied degrees of curvature to the rope, depending upon its stiffness, a more flexible rope being given a greater degree and magnitude of bend than a less flexible rope.

The operation of the device and the process of treatment to accomplish the purposes of the invention will be readily understood. The rope, as it passes through the unit 12, is given a rapid bending back and forth by the two gears 33, the gears, revolving in opposite directions, counteracting the tendency of each spool to place a permanent kink or set in the wire. The angle of the bend and its magnitude is determined by the character of the wire, enough bend being imparted to the rope to bend it beyond its elastic limit. The adjustment of the bushings off center and out of alignment with the fixed guides 45 and 46 and the progressive rotary bending of the rope back and forth beyond its elastic limit as it is drawn through the treating unit puts a permanent set in each individual wire and each strand, leaving the strands and wire free from strains and stresses. The process puts the strands down to their proper seat on the core of the rope and gives a more perfect lay to the wires. The various advantages which were set forth above are accomplished in a simple and inexpensive manner and wire rope made in the usual way is given the improved qualities with a very small outlay. While only two bending movements are imparted to the rope by the apparatus shown, it will be appreciated that the number may be increased, and the magnitude may be changed to suit the particular conditions met with.

It will be understood, of course, that the speed of feeding the rope and the speed of rotating the spools 38 is properly coordinated to insure the desired bending and unbending of each component at the focus 45, so as to eliminate the expansile characteristic therefrom throughout the rope.

What is claimed is:

1. A process of treating wire rope formed of multiple helically wound wire components with an expansile characteristic, said process comprising fixing the position of the rope at spaced points, giving the rope between such points an acute angular bend, drawing the rope through such bend, and moving the bent portion of the rope in a rotary path, in such a manner that each of said helical components is alternately bent and unbent, whereby said expansile characteristic is eliminated.

2. A process of treating wire rope formed of multiple helically wound wire components with an expansile characteristic, said process comprising fixing the position of the rope at three spaced points, giving the rope between the spaced points acute angular bends in opposite directions, and moving the bends of the rope in rotary paths in opposite directions, in such a manner that each of said helical components is alternately bent and unbent, whereby said expansile characteristic is eliminated.

3. A process of treating wire rope formed of multiple helically wound wire components with an expansile characteristic, said process comprising giving the rope acute bending and unbending movements beyond its elastic limit, and advancing such bending movement progressively along the rope in such a manner that each of said helical components is alternately bent and unbent, whereby said expansile characteristic is eliminated.

4. A process of treating wire rope formed of multiple helically wound wire components with an expansile characteristic, said process comprising giving the rope oppositely directed bending movements in rotary paths about the axis of the rope to a degree beyond its elastic limit, and advancing such bending movement progressively along the rope, in such a manner that each of said helical components is alternately bent and unbent, whereby said expansile characteristic is eliminated.

5. A process of treating wire rope for the uses and purposes set forth, comprising giving the rope oppositely directed bending movements in rotary paths in opposite directions about the axis of the rope to a degree beyond its elastic limit, and advancing such bending movement progressively along the rope.

GORMAN C. BURD.